US007139621B2

(12) United States Patent
Gharsalli

(10) Patent No.: US 7,139,621 B2
(45) Date of Patent: Nov. 21, 2006

(54) FLOATING DEADBAND CONTROL

(75) Inventor: Imed Gharsalli, Brimfield, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/012,161

(22) Filed: Dec. 16, 2004

(65) Prior Publication Data

US 2006/0136092 A1 Jun. 22, 2006

(51) Int. Cl.

| | |
|---|---|
| ***G05B 11/01*** | (2006.01) |
| ***G05B 19/18*** | (2006.01) |
| ***G05B 15/00*** | (2006.01) |
| ***B62D 6/00*** | (2006.01) |
| ***G06F 7/00*** | (2006.01) |
| ***G05G 9/47*** | (2006.01) |
| *G05D 1/02* | (2006.01) |
| *G05D 1/10* | (2006.01) |
| *G06F 17/00* | (2006.01) |
| *G06F 19/00* | (2006.01) |

(52) U.S. Cl. ............................ 700/72; 700/61; 700/85; 700/302; 318/624; 318/632; 701/41; 74/471 XY; 74/495

(58) Field of Classification Search .................. 700/56, 700/61–64, 66, 83, 85, 302, 71, 72; 345/161, 345/162; 701/36, 41; 74/471 XY, 469, 74/491, 495; 318/611, 624, 632

See application file for complete search history.

(56) References Cited

U.S. PATENT DOCUMENTS 4,507,601 A * 3/1985 Andresen .................... 323/347
5,249,422 A * 10/1993 Smith et al. .................. 60/426
5,831,596 A 11/1998 Marshall et al.
5,918,195 A * 6/1999 Halgrimson et al. .......... 702/94
6,148,939 A 11/2000 Brookhart et al.
6,259,433 B1 7/2001 Meyers
6,305,162 B1 * 10/2001 Cobo et al. ................... 60/422
6,460,639 B1 * 10/2002 Hori et al. ................... 180/6.2
6,538,637 B1 * 3/2003 Kor ............................ 345/156
6,542,789 B1 * 4/2003 Ufheil ........................ 700/275
6,580,417 B1 6/2003 Rosenberg et al.
6,651,544 B1 * 11/2003 Skinner .................... 91/363 R
6,695,294 B1 * 2/2004 Miller et al. ............. 267/64.16
6,738,695 B1 * 5/2004 Motz et al. ................... 701/23
6,750,845 B1 6/2004 Hopper
2004/0100145 A1 5/2004 Holt et al.
2006/0015229 A1 * 1/2006 Lange et al. .................. 701/41

FOREIGN PATENT DOCUMENTS

JP 06222852 A * 8/1994
WO WO 2004/021330 A1 3/2004

* cited by examiner

*Primary Examiner*—Crystal J. Barnes
(74) *Attorney, Agent, or Firm*—Finnegan,Henderson, Farabow,Garrett&Dunner

(57) ABSTRACT

A control system having a floating deadband control includes an input device moveable from a first position to a second position. In addition, the control system includes a controller configured to automatically generate a first electronically defined deadband about the first position when the input device is at the first position and configured to automatically generate a second electronically defined deadband about the second position when the input device is at the second position.

32 Claims, 5 Drawing Sheets

FLOATING DEADBAND CONTROL

TECHNICAL FIELD

This disclosure is directed to a floating deadband control and, more particularly, to a floating deadband control for an interface between an operator and a machine.

BACKGROUND

Interface devices between an operator and a machine are used to input command signals and other information to control the machine. One type of interface device is configured to be manipulated by an operator and controls the machine by generating and sending a signal based on the position of the device. One example of such a device is a joystick. Many joysticks are spring-loaded so that the joystick is biased toward a central, neutral position. Accordingly, when the joystick is released at a location other than the neutral position, the biasing force restores the joystick to the central, neutral position.

Often, interface devices, as well as the machines they operate, are subject to electronic noise or feedback signals that may distort a true input signal. Electronic noise or feedback may be caused by a variety of factors, including flux fields and magnetic fields generated within proximity of the interface device or communication wires between the interface device and the controller. Further, some small, inadvertent movements of the interface device may distort a desired input signal. Because of this electronic noise, feedback, possible inadvertent movement, the control signal may vary from moment to moment, even when the interface device itself is not moving or when interface device movement is undesirable. Thus, in some instances, even though there may be no signal being generated at the interface device, a controller may still receive a signal generated as electronic noise.

One method of filtering the electronic noise, feedback, and small inadvertent signals includes generating a deadband around the neutral position of the interface device, such as the neutral position of a spring-loaded joystick. The deadband is a filtering zone that filters a signal, for example, a signal which varies from an average signal by less than half the width of the deadband. The filtered signal is not treated as an input by the controller. In contrast, when the signal is outside the width of the deadband, the controller considers the signal.

One known system that uses a deadband is disclosed in U.S. Pat. No. 6,750,845 to Hopper. The '845 patent discloses a computer pointing device that may be used to control a cursor on a machine, such as a computer. The pointing device is configured so that it may be operated in environments that may be perpendicular or non-perpendicular to a gravitational field and includes a deadband about its neutral region. When the pointing device is subject to non-perpendicular gravitational forces, the input device may be at rest outside its deadband. When this occurs, a user can activate and instruct the computer to create a new deadband around the resting position. However, the computer pointing device in the '845 patent requires that an operator affirmatively select the new deadband position. Further, the pointing device in the '845 patent is not configured to be used with a non-biased joystick.

This disclosure is intended to address one or more of the deficiencies of the prior art.

SUMMARY OF THE INVENTION

In one exemplary aspect, a control system having a floating deadband control is disclosed. The control system includes an input device moveable from a first position to a second position. In addition, the control system includes a controller configured to automatically generate a first electronically defined deadband about the first position when the input device is at the first position and configured to automatically generate a second electronically defined deadband about the second position when the input device is at the second position.

In another exemplary aspect, a method of controlling an input device is disclosed. The method includes automatically generating a first electronically defined deadband about a first position when the input device is at a first position, and then moving the input device from the first position to a second position. A second electronically defined deadband is automatically generated about the second position when the input device is at the second position.

FIG. **4*a*** is an illustration showing an axis with a deadband at a neutral position.

Figure 4A:
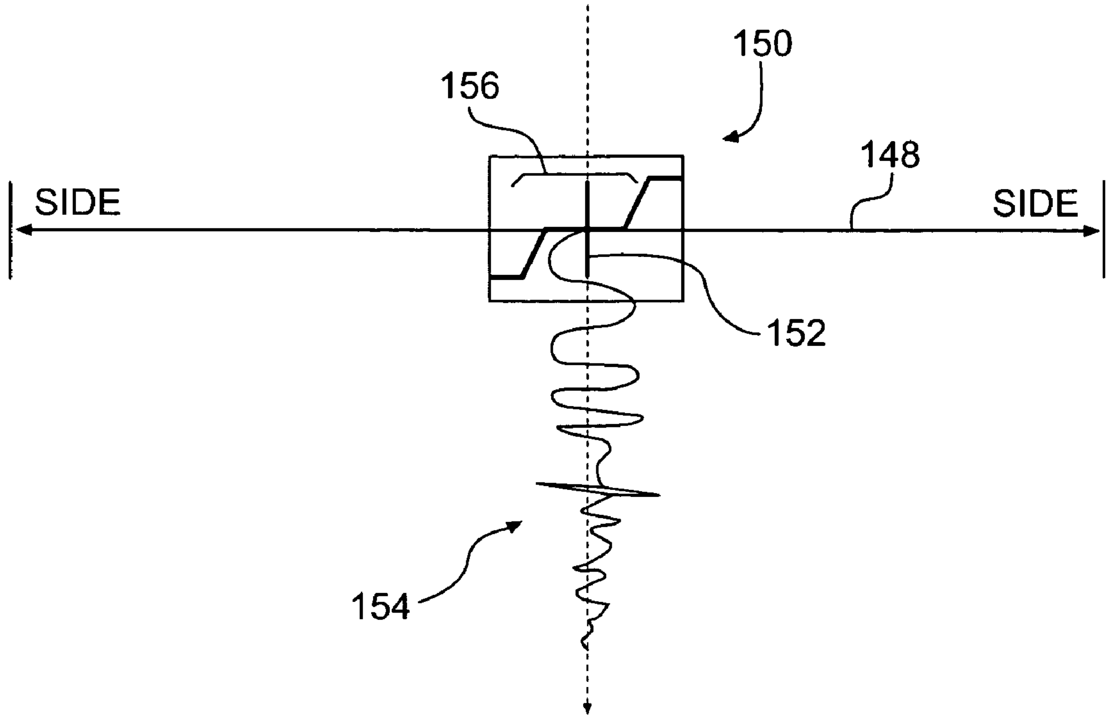

FIG. **4*b* is an illustration showing the axis of FIG. 4*a*** with the deadband at a position different than the neutral position.

Figure 5:
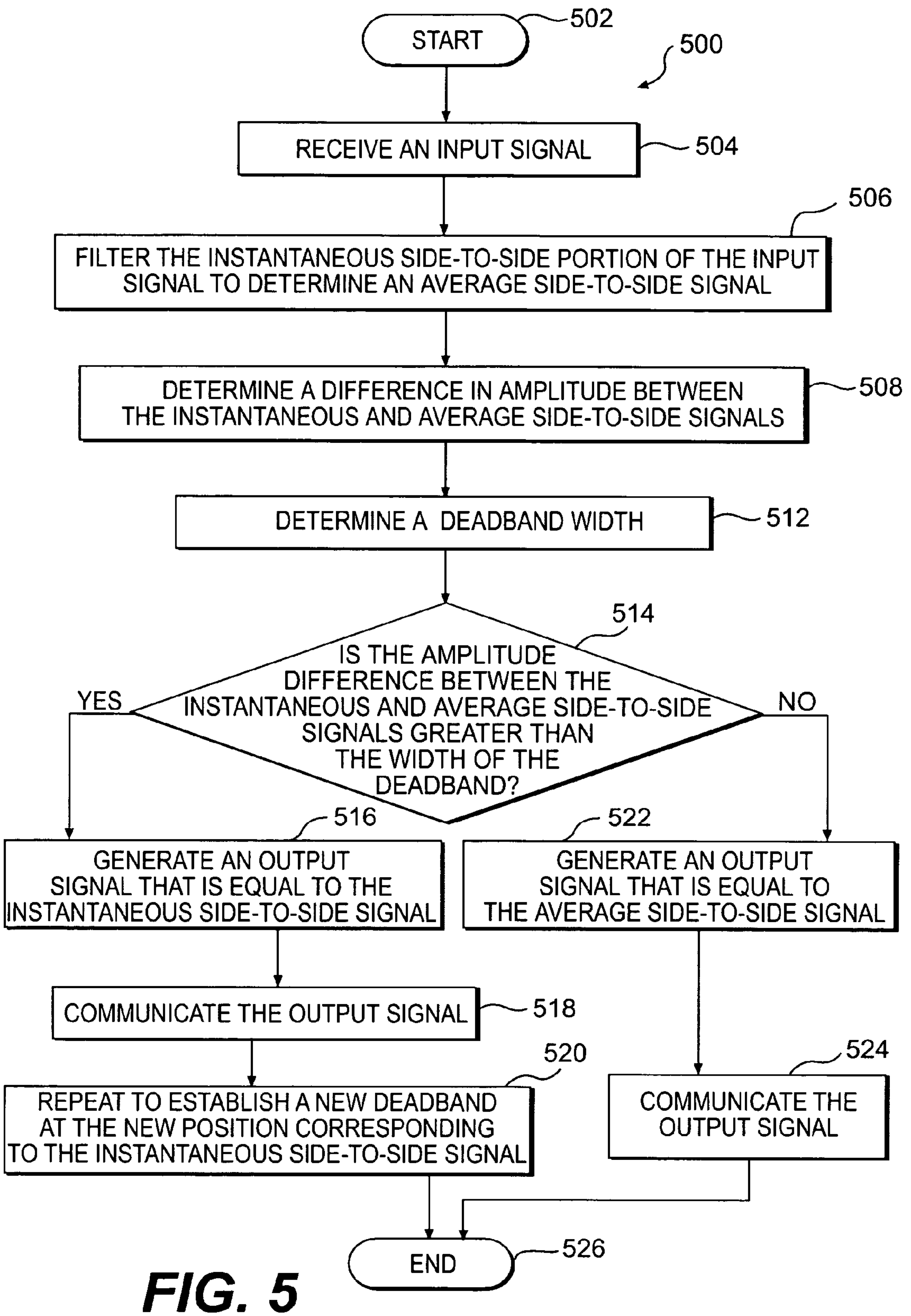

FIG. 5 is a flow chart showing an exemplary method for generating a floating deadband.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
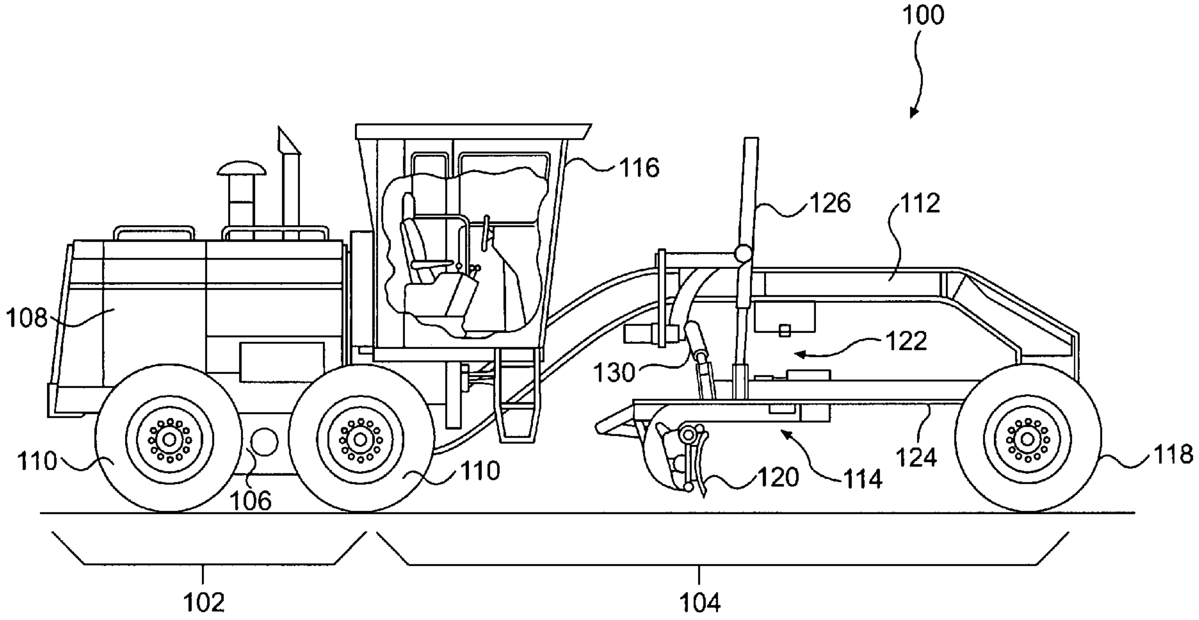
FIG. 1 is a pictorial representation of a side view of an exemplary motor grader.

An exemplary embodiment of a motor grader 100 is illustrated in FIG. 1. The motor grader 100 includes a rear frame section 102 and a front frame section 104. The rear frame section 102 includes a rear frame 106 and an engine in an engine compartment 108. The engine in the engine compartment 108 may be mounted on the rear frame 106 and may drive or power rear ground engaging devices, such as wheels 110 on the motor grader 100.

The front frame section 104 includes a front frame 112, a blade assembly 114, and an operator cab 116. The front frame 112 extends from ground engaging devices, such as front wheels 118, toward the rear wheels 110, and supports the operator cab 116. The front wheels 118 may be steered by fluid actuators (not shown) operable based on steering signals initiated in the operator cab 116. The operator cab 116 may contain a control system, including an input device, that allows an operator to operate, drive, and steer the motor grader 100.

The blade assembly 114 includes a blade 120 and a linkage assembly 122 that allows the blade 120 to be moved to a variety of different positions relative to the motor grader 100. The linkage assembly 122 includes a drawbar 124, a lift cylinder 126, and a center shift cylinder 130.

Figure 2:
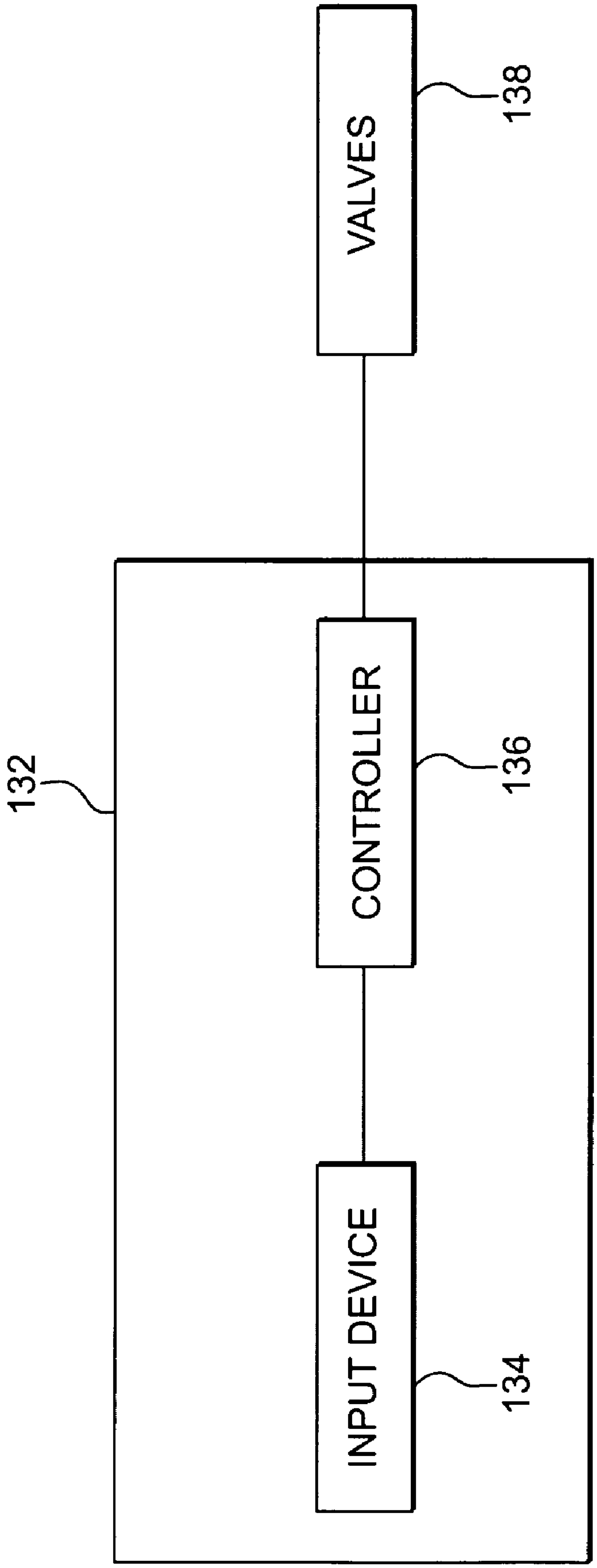
FIG. 2 is a block diagram of an exemplary control system.

One exemplary embodiment of a control system for driving the motorgrader 100 is shown and described with reference to FIG. 2. FIG. 2 shows a control system 132 and valves 138. The control system 132 may be a steering control system configured to send an output signal, as an output steering signal, to the valves 138. The valves 138 may be operably associated with cylinders for turning the front wheels 118 to steer the motor grader 100.

The control system 132 may include an input device 134 and a controller 136. Using the input device 134, an operator may generate an input signal, that is sent to the controller 136. The controller 136 may process the input signal to determine the output signal, which may then be output from the controller 136.

The input device 134 could be any input device known in the art, including a joystick, a keyboard, a lever, or other input device. In one exemplary embodiment, the input device 134 is a joystick configured to generate a steering input signal for steering the motor grader 100 and a lift signal for operating the blade assembly 114 of the motor grader 100. The joystick may include buttons, triggers, and/or other input devices.

Figure 3:
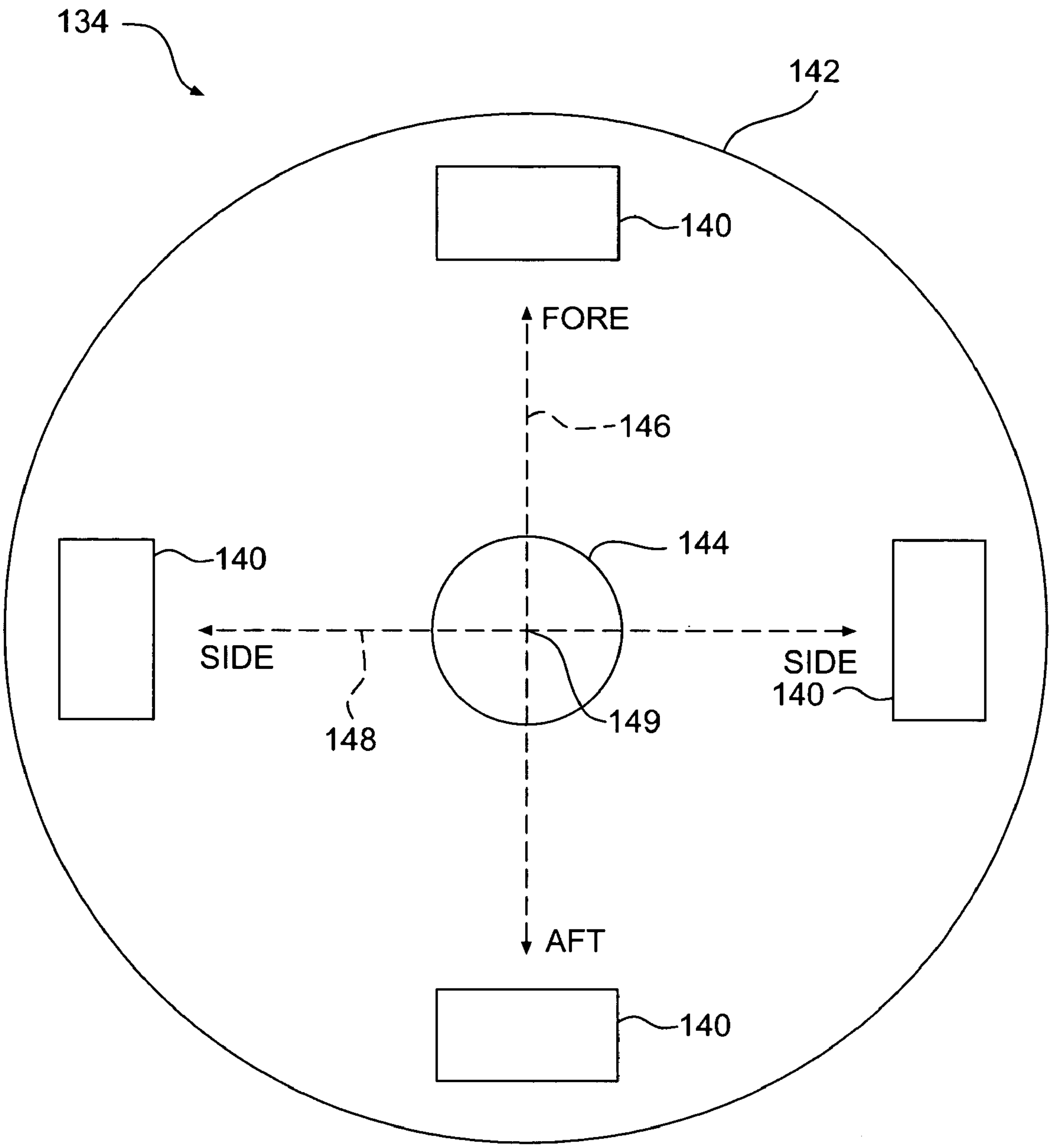
FIG. 3 is diagrammatic illustration of a top view of elements of a base portion of an exemplary input device.

FIG. 3 shows one exemplary embodiment of a base portion 142 of a joystick as a portion of the input device 134. The base portion 142 may include the actual signal generating components of the input device 134. In this exemplary embodiment, the signal generating components may include a magnet 144 and four hall effect sensors 140 disposed about the base portion 142. The hall effect sensors 140 may be transducers that generate an electric signal based upon their proximity to the magnet 144. The magnet 144 may be disposed centrally between the hall effect sensors 140, and may be moveable relative to the hall effect sensors 140. When the input device 134 is a joystick, the magnet 144 may be connected to an end of a shaft (not shown) extending from the joystick. Accordingly, by manipulating the joystick, the shaft may displace the magnet 144 relative to the hall effect sensors 140. By varying the proximity between the magnet 144 and the hall effect sensors 140, the input device 134 may generate a signal, such as the input signal, that may be communicated to the controller 136.

FIG. 3 also shows a fore-aft axis 146 and a side-to-side axis 148. The axes 146, 148 are shown for reference purposes only, as the magnet 144 may be movable to any position about the base 142 within the central area of the hall effect sensors 140. As used herein, movement in the fore-aft direction may generate a fore-aft signal, while movement in the side-to-side direction may generate a side-to-side signal. Together, the fore-aft signal and the side-to-side signal make up the input signal. The intersection 149 of the axes 146, 148 may define a neutral or central position. In the exemplary embodiment described herein, the fore-aft signal may be a lift signal for controlling the blade assembly 114 of the motor grader 100. In contrast, the side-to-side signal may be a steering signal for steering the motorgrader 100.

The input device 134 may be configured so that movement of the magnet 144 solely in the direction of the side-to-side axis 148 may change only the steering signal, while movement of the magnet 144 solely in the direction of the fore-aft axis 146 may change only the lift signal. However, because the hall effect sensors 140 generate the input signal based upon their proximity to the magnet 144, even when the magnet 144 moves solely in the direction of one of the axes 146, 148, the magnet is still displaced relative to the hall effect sensors 140 that monitor the other of the axes 146, 148. This displacement generates electrical noise. Furthermore, the greater the distance that the magnet 144 travels from the central position of the axis 146, 148, the more electrical noise that may be generated. This electrical noise may be undesirably communicated from the input device 134 as a part of the input signal.

Although the control system 132 may be used with any suitable input device, in one exemplary embodiment, the input device 134 may be configured so that movement in the fore-aft direction is biased with a biasing force toward the side-to-side axis 148. The biasing force may be a spring force or other force. The input device also may be configured to be unbiased in the direction of the side-to-side axis 148. Therefore, the input device 134 may not automatically return to a center or neutral position in the side-to-side direction.

In one exemplary embodiment, a frictional brake and/or other brake may be used to hold the input device in a position off-set from the neutral position in the side-to-side direction.

Returning to FIG. 2, the controller 136 may be any suitable controller and may include a processor and/or a memory component. The memory component may be any memory configured to store data, processes, and/or computer program product, such as computer code. The processor may be configured to receive and process the input signal based on the information stored within the memory component.

The controller 136 may be configured to receive the input signal, including the side-to-side signal, the fore-aft signal, and any electrical noise or small inadvertent signals from the input device 134. Further, the controller 136 may be configured to process the input signal and generate an output signal, such as an output steering signal based on the input signal.

In order to process the input signal and to control the motor grader 100, the controller 136 is also configured to generate a floating deadband. A floating deadband allows the deadband to automatically follow the average input signal, so that the deadband may be located not only at the neutral position, but also at other positions.

Figure 4B:
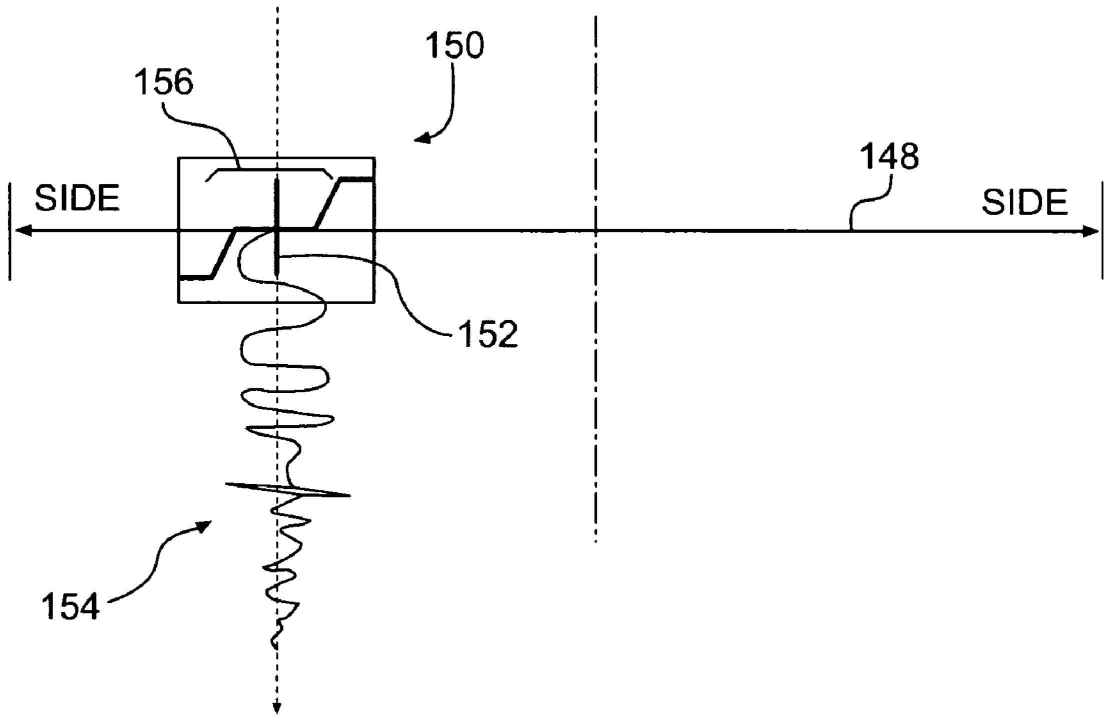

FIGS. 4*a* and 4*b* are illustrations representative of a deadband 150 generated by the controller 136. The deadband 150 is shown relative to a position on the side-to-side axis 148. In addition to the deadband 150, FIGS. 4*a* and 4*b* show an average side-to-side signal 152, an instantaneous side-to-side signal 154, and a deadband width 156. FIG. 4*a* shows the deadband 150 at a neutral or middle position, that may be referred to as a first position. FIG. 4*b* shows the deadband 150 at a position offset from the neutral position, that may be referred to as a second position. The deadband position may be offset when an operator manipulates the input device 134 to move the magnet 144 in the side-to-side direction.

The deadband 150 has a specific width 156 along the side-to-side axis 148. The side-to-side signals that vary from the average signal by less than half of the deadband width 156 are filtered out and are not considered by the controller 136 when determining the output signal. The size of the deadband width 156 may be determined by various means including, for example, by an algorithm, by expected electronic noise, through testing, and/or by assigning a specific width.

In one exemplary embodiment, the controller 136 is determined to generate the deadband width 156 based on the position of the input device 134. In this embodiment, the size of the deadband width 156 may vary depending on the location of the magnet 144 relative to the hall effect sensors 140. In another exemplary embodiment, the deadband width 156 is based on an algorithm function that considers movement of the input device 134 in the direction of the fore-aft axis 146. For example, as the magnet 144 moves in the fore-aft direction away from the side-to-side axis 148, the algorithm may increase the deadband width 156 to compensate for the increased electronic noise. In one exemplary embodiment, the controller 136 is configured to calculate the deadband width 156 so that it is equal to or slightly greater than the amplitude variation of any expected electronic noise.

FIGS. 4*a* and 4*b* show an exemplary instantaneous side-to-side signal 154. As shown, the instantaneous side-to-side signal 154 may include perturbations of varying amplitudes. In the exemplary embodiment shown, the perturbations are small, less than the deadband width 156. These perturbations may be generated by electrical noise and/or slight, inadvertent movement of the input device 134. It should be noted that the instantaneous side-to-side signal 154 may also include large variations in the signals, such as when an operator displaces the input device 134 to control steering on the work machine 100. A large variation in the signal would exceed the width 156 of the deadband 150, as is explained below.

Located within the deadband 150 in FIGS. 4*a* and 4*b*, a solid bar represents the average side-to-side signal 152 received from the input device 134. The average side-to-side signal 152 is an average of the amplitude of the instantaneous side-to-side signal 154.

When the average side-to-side signal 152 is within the width of the deadband 150, the controller 136 may be configured to filter the perturbations in the instantaneous side-to-side signal 154. The controller 136 may then generate an output signal, corresponding to the average side-to-side signal 152 that is more stable than the instantaneous side-to-side signal.

In one exemplary embodiment, so long as the average signal 152 is within the deadband width 156, the output signal from the controller 136 is established to be equal to the average side-to-side signal. However, when the average side-to-side signal 152 moves outside the width 156 of the deadband 150, then the controller 136 may be configured to determine the output signal to match the instantaneous received side-to-side signal. This is done because an average side-to-side signal that is outside the deadband width 156 may include, in addition to the electronic noise, an intentional side-to-side signal from the operator.

FIG. 4B represents a situation where the input device 134 is disposed at a second position along the side-to-side axis 148, away from the first, neutral position. At the second position, the controller 136 may automatically generate a new deadband 150 that is offset from the neutral position. Although the deadband 150 in FIG. 4*b* is displaced from the neutral position, the instantaneous side-to-side signal 154 still includes perturbations, such as electronic noise or slight inadvertent input device movement. Again, so long as the average side-to-side signal does not exceed the width 156 of the deadband 150, the controller 136 may generate an output signal equal to the average side-to-side signal 152 at the new, second position. Accordingly, the deadband 150 may be used to compensate for the electronic noise and generate a stable output signal. Although disclosed at only two positions, the control system 132 may generate a floating deadband 150 at any point along the side-to-side axis 148. In other embodiments, the floating deadband 150 is not limited to the side-to-side axis 148, but also may be generated at any location of movement in the fore-aft direction, or alternatively, at any position of the input device 134.

INDUSTRIAL APPLICABILITY

The floating deadband disclosed herein allows a control system to filter out signal perturbations not only when the input device 134 is at a neutral position, but also when the input device 134 is at positions other than the neutral position. The signal perturbations may be generated by for example, electronic noise, feedback, and slight inadvertent movement of the input device 134. Therefore, the controller 136 may generate an output signal that is based on a true input signal that is unaffected by the perturbations.

The floating deadband may be particularly useful when the input device 134 is a joystick that may maintain itself at a position other than the neutral position. Accordingly, regardless of the position of the joystick, the floating deadband 150 may be automatically disposed at the joystick position and continue to filter perturbations.

When the input device 134 is used as a steering device in the exemplary motor grader environment, the controller 136 may generate the output steering signal based on the intent of the operator, and the output steering signal may be sent to the valves 138 to control the steering. Because the floating deadband 150 filters the perturbations, the output steering signal may be a substantially smooth signal, without significant fluctuations, providing relatively smooth and stable steering.

In one exemplary embodiment, and as explained above, the input device 134 is biased toward the neutral position in the fore-aft direction by a biasing force. However, the input device 134 may be mechanically maintained in a desired position when moved in a side-to-side direction by a brake, such as, for example, a frictional brake.

One exemplary method of implementing the control system 132 is shown in a flow chart 500 in FIG. 5. The method begins at a start step 502. At a step 504, the controller 136 receives the input signal from the input device 134. As explained above, the input signal may include and/or be generated by electrical noise. In addition, and when desired by an operator, the input signal may also include an operator input from the input device 134. In the exemplary motor grader environment, the input signal may include an instantaneous side-to-side signal and a fore-aft signal, with the side-to-side signal being a steering signal and the fore-aft signal being a lift signal for controlling the blade assembly 114.

At a step 506, the controller 136 filters the instantaneous side-to-side signal of the input signal, including any perturbations, and determines an average side-to-side input signal. The filtering may be accomplished using a low-pass filter. At a step 508, the controller 136 compares the instantaneous and the average side-to-side input signals and determines a difference in amplitude.

At a step 512, the controller determines the width 156 of the deadband 150. In one exemplary embodiment, the deadband width 156 may be determined as a function of the fore-aft signal of the input signal. In other exemplary embodiments, the deadband width 156 is determined by an algorithm, by expected electronic noise, through testing, and/or by assigning a specific width. In one exemplary embodiment, the deadband width 156 may be established to be equal to or greater than the variation in the electronic noise of the instantaneous side-to-side signal.

At a step 514, the controller 136 queries whether the difference between the instantaneous and the average side-to-side signals is greater than the deadband width. If the controller 136 determines that the difference between the instantaneous and the average side-to-side signals is greater than the width 156 of the deadband 150 (step 514: yes), then the controller 136 generates an output signal that is substantially equal to the instantaneous side-to-side signal, at a step 516. Therefore, the controller 136 has effectively determined that in addition to the electronic noise 154, the instantaneous side-to-side signal may include an additional intentional input from the operator to control the steering.

At a step 518, the output signal is communicated to a separate component of the machine, such as the valves 138. At a step 520, the method may be repeated to establish a new deadband at the new position, corresponding to the instantaneous side-to-side signal.

If at step 514 the controller 136 determines that the difference between the instantaneous and average side-to-side signals is not greater than the width 156 of the deadband 150 (step 541: no), then the controller advances to a step 522. At step 522, the controller 136 generates the output signal to be substantially equal to the average side-to-side signal. Accordingly, at step 522, the controller 136 has effectively determined that the instantaneous side-to-side signal received is solely or primarily electronic noise. Because the instantaneous side-to-side signal is solely or primarily electronic noise 154, the controller 136 establishes the output signal to be substantially equal to the average side-to-side signal. Doing so, the controller 136 may reduce the effect of perturbations in the instantaneous side-to-side signal that are not the effect of an intentional operator input.

At a step 524, the output signal is communicated to a separate component, such as the valves 138. At a step 526, the method ends. The method may then be repeated.

EXAMPLE 1

One example of filtering an input signal with the deadband 150 is disclosed with reference to the method 500. At step 504, the controller receives an input signal having an instantaneous side-to-side signal at an amplitude of 750. At step 506, the controller 136 filters the instantaneous side-to-side portion and determines that the average side-to-side signal has an amplitude of 700. At step 508, the difference between the instantaneous and the average side-to-side signals is determined to be 50.

The deadband width 156 may be determined based on the fore-aft signal of the input signal, and may be established to have an amplitude of 100, at step 512. At step 514, the controller 136 determines that the difference is less than the width. Therefore, at step 522, the controller 136 sets the output signal substantially equal to the average side-to-side signal, which is 700. At step 524, the output signal is communicated to the machine.

EXAMPLE 2

Another example of filtering with the deadband is disclosed below. At step 504, the controller 136 receives an input signal having an instantaneous side-to-side signal at an amplitude of 860. At step 506, the controller filters the side-to-side portion and determines that the average side-to-side signal has an amplitude of 750. At step 508, the difference between the instantaneous and the average side-to-side signals is determined to be 110.

The deadband width may be determined based on the fore-aft signal, and may be established to have an amplitude of 100, at step 512. At step 514, the controller 236 determines that the difference is greater than the width. Therefore, the controller sets the output signal substantially equal to the instantaneous side-to-side signal of 860, at step 516. The controller communicates the output signal at step 518 and repeats the method to filter the input signal at the new position at step 520.

Although the described control system is disclosed with reference to a steering system on a motor grader, the floating deadband control may be used on any electronic interface between a user and/or an operator and the machine. For example, the floating deadband control may be usable for any joystick steering system. Further, the floating deadband control may be usable with other systems, such as in a system having a joystick for video games.

Furthermore, although the invention is described with reference to an input device 134 that is biased to a neutral position in the fore-aft direction, and is not biased in the side-to-side direction, the floating deadband control is not limited to such an input device. For example, the floating deadband control may be used where the input device is biased to the neutral position from every direction, and also where there is not any bias of the input device. Further, it may be used within any range in between these extremes, including in situations where the side-to-side movement is biased but the fore-aft movement is not. The disclosed control system may find use in any situation where the input device is an electronic input device.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A control system having a floating dead band control comprising:

an input device moveable along a path from a first position to any position along the path; and a controller configured to automatically generate a first electronically defined deadband about the first position when the input device is at the first position and configured to automatically generate an additional electronically defined deadband about substantially any point along the path to which the input device is moved.

2. The control system of claim 1, wherein the deadband has a width configured to cancel electronic noise at both the first and second positions.

3. The control system of claim 1, wherein the deadband has a width that is determined as a function of a position of the input device.

4. The control system of claim 1, wherein the controller is configured to determine an output signal based on the difference between an instantaneous input signal and an average amplitude of the instantaneous input signal.

5. The control system of claim 1, wherein the input device is moveable in a direction of a first axis and moveable in a direction of a second axis that is perpendicular to the first axis.

6. The control system of claim 5, wherein the controller is configured to determine a width of the deadband based on an algorithm function that considers a position of the input device in a direction along the second axis.

7. The control system of claim 5, wherein the input device is configured to maintain itself at any position along the path, the controller being configured to define the deadband about the input device at any of the positions.

8. The control system of claim 1, wherein the input device is configured to maintain itself at any position along the path.

9. The control system of claim 1, wherein the input device is a joystick configured to be mechanically maintained at a non-neutral position.

10. The control system of claim 1, wherein the input device is a joystick configured to be mechanically maintained at a non-neutral position in the direction of a first axis, and wherein the joystick is biased toward a neutral position in the direction of a second axis, the first and second axes being perpendicular.

11. A method of controlling an input device, comprising:

automatically generating a first electronically defined deadband about a first position when the input device is at a first position;

moving the input device from the first position along a path; and automatically generating an additional electronically defined deadband about substantially any point along the path to which the input device is moved.

12. The method of claim 11, including determining a width of the deadband as a function of a position of the input device.

13. The method of claim 11, including:

determining an output signal with a controller based on the difference between an instantaneous input signal and an average amplitude of the instantaneous input signal; and communicating the output signal to a machine component.

14. The method of claim 11, including:

filtering a signal with the deadband, the signal corresponding to a position of the input device along a first axis; and determining a width of the deadband based on an algorithm function that considers movement of the input device in a direction along a second axis, substantially perpendicular to the first axis.

15. The method of claim 11, including defining the deadband about the input device when the input device is positioned at any point along the path.

16. The method of claim 11, including mechanically maintaining the input device at any point along the path.

17. A machine, comprising:

a frame;

ground engaging traction devices supporting the frame;

a joystick configured to generate a steering signal to control the steering of the ground engaging traction devices, the joystick being moveable along a path from a first position to any point along the path; and a controller configured to receive the steering signal and automatically generate a first electronically defined deadband about the first position when the joystick is at the first position and configured to automatically generate an additional electronically defined deadband about substantially any point along the oath to which the joystick is moved.

18. The machine of claim 17, wherein the deadband has a width that is determined as a function of a position of the joystick.

19. The machine of claim 18, wherein the joystick is moveable to generate the steering signal based on a position of the joystick in the direction of a first axis, and wherein the width of the deadband is based on a position of the joystick in the direction of a second axis that is substantially perpendicular to the first axis.

20. The machine of claim 17, wherein the controller is configured to determine an output steering signal based on the difference between an instantaneous input signal and an average amplitude of the instantaneous input signal.

21. The machine of claim 17, wherein the joystick is configured to maintain itself at any position along the path, the controller being configured to define the deadband about the joystick at any of the positions.

22. The machine of claim 17, wherein the joystick is configured to be mechanically maintained at a non-neutral position in the direction of a first axis, and wherein the joystick is biased toward a neutral position in the direction of a second axis, the first and second axes being perpendicular.

23. A control system having a floating deadband control comprising:

an input device moveable from a first position to a second position;

a controller configured to automatically generate a first electronically defined deadband about the first position when the input device is at the first position and configured to automatically generate a second electronically defined deadband about the second position when the input device is at the second position, and wherein the controller is configured to determine an output signal based on the difference between an instantaneous input signal and an average amplitude of the instantaneous input signal.

24. A control system having a floating deadband control comprising:

an input device moveable from a first position to a second position;

a controller configured to automatically generate a first electronically defined deadband about the first position when the input device is at the first position and configured to automatically generate a second electronically defined deadband about the second position when the input device is at the second position, and wherein the input device is moveable in a direction of a first axis and moveable in a direction of a second axis that is perpendicular to the first axis.

25. The control system of claim 24, wherein the controller is configured to determine a width of the deadband based on an algorithm function that considers a position of the input device in a direction along the second axis.

26. The control system of claim 24, wherein the input device is configured to maintain itself at any position along the first axis between the first and second positions, the controller being configured to define the deadband about the input device at any point along the first axis between the first and second positions.

27. A control system having a floating deadband control comprising:

an input device moveable from a first position to a second position;

a controller configured to automatically generate a first electronically defined deadband about the first position when the input device is at the first position and configured to automatically generate a second electronically defined deadband about the second position when the input device is at the second position, and wherein the input device is a joystick configured to be mechanically maintained at a non-neutral position in the direction of a first axis, and wherein the joystick is biased toward a neutral position in the direction of a second axis, the first and second axes being perpendicular.

28. A method of controlling an input device, comprising:

automatically generating a first electronically defined deadband about a first position when the input device is at a first position;

moving the input device from the first position to a second position;

automatically generating a second electronically defined deadband about the second position when the input device is at the second position;

determining an output signal with a controller based on the difference between an instantaneous input signal and an average amplitude of the instantaneous input signal; and communicating the output signal to a machine component.

29. A method of controlling an input device, comprising:

automatically generating a first electronically defined deadband about a first position when the input device is at a first position;

moving the input device from the first position to a second position;

automatically generating a second electronically defined deadband about the second position when the input device is at the second position;

filtering a signal with the deadband, the signal corresponding to a position of the input device along a first axis; and determining a width of the deadband based on an algorithm function that considers movement of the input device in a direction along a second axis, substantially perpendicular to the first axis.

30. A machine, comprising:

a frame;

ground engaging traction devices supporting the frame;

a joystick configured to generate a steering signal to control the steering of the ground engaging traction devices, the joystick being moveable from a first position to a second position;

a controller configured to receive the steering signal and automatically generate a first electronically defined deadband about the first position when the joystick is at the first position and configured to automatically generate a second electronically defined deadband about the second position when the joystick is at the second position;

wherein the deadband has a width that is determined as a function of a position of the joystick; and wherein the joystick is moveable to generate the steering signal based on a position of the joystick in the direction of a first axis, and wherein the width of the dead band is based on a position of the joystick in the direction of a second axis that is substantially perpendicular to the first axis.

31. A machine, comprising:

a frame;

ground engaging traction devices supporting the frame;

a joystick configured to generate a steering signal to control the steering of the ground engaging traction devices, the joystick being moveable from a first position to a second position;

a controller configured to receive the steering signal and automatically generate a first electronically defined deadband about the first position when the joystick is at the first position and configured to automatically generate a second electronically defined deadband about the second position when the joystick is at the second position; and wherein the controller is configured to determine an output steering signal based on the difference between an instantaneous input signal and an average amplitude of the instantaneous input signal.

32. A machine, comprising:

a frame;

ground engaging traction devices supporting the frame;

a joystick configured to generate a steering signal to control the steering of the ground engaging traction devices, the joystick being moveable from a first position to a second position;

a controller configured to receive the steering signal and automatically generate a first electronically defined deadband about the first position when the joystick is at the first position and configured to automatically generate a second electronically defined dead band about the second position when the joystick is at the second position; and wherein the joystick is configured to be mechanically maintained at a non-neutral position in the direction of a first axis, and wherein the joystick is biased toward a neutral position in the direction of a second axis, the first and second axes being perpendicular.

* * * * *

UNITED STATES PATENT AND TRADEMARK OFFICE
CERTIFICATE OF CORRECTION

PATENT NO. : 7,139,621 B2
APPLICATION NO. : 11/012161
DATED : November 21, 2006
INVENTOR(S) : Imed Gharsalli It is certified that error appears in the above-identified patent and that said Letters Patent is hereby corrected as shown below:

Claim 17, column 9, line 57, delete “oath” and insert --path--

Claim 32, column 12, line 36, omit space between “dead band” to read --deadband--

Signed and Sealed this

Third Day of April, 2007

JON W. DUDAS
*Director of the United States Patent and Trademark Office*